(12) United States Patent
Hallbjörner (10) Patent No.: US 6,396,439 B1
(45) Date of Patent: May 28, 2002

(54) METHOD FOR CONTROLLING THE RADIATION PATTERN OF AN ANTENNA MEANS, AN ANTENNA SYSTEM AND A RADIO COMMUNICATION DEVICE

(75) Inventor: Paul Hallbjörner, Gothenburg (SE)

(73) Assignee: Allgon AB, Akersberga (SE)

( * ) Notice: Subject to any disclaimer, the term of this patent is extended or adjusted under 35 U.S.C. 154(b) by 0 days.

(21) Appl. No.: 09/346,947

(22) Filed: Jul. 2, 1999

(30) Foreign Application Priority Data

Jun. 11, 1999 (SE) ................................. 9902213

(51) Int. Cl.⁷ ............................. H01Q 1/36; H01Q 1/24
(52) U.S. Cl. ........................................ 343/89.5; 343/702
(58) Field of Search ........................... 343/702, 703, 343/853, 895; 342/375

(56) References Cited

U.S. PATENT DOCUMENTS

| | | | |
|---|---|---|---|
| 5,191,352 A | 3/1993 | Branson | 343/895 |
| 5,255,005 A | 10/1993 | Terret et al. | 343/895 |
| 5,541,617 A | 7/1996 | Connolly et al. | 343/895 |
| 5,628,057 A | 5/1997 | Phillips et al. | 455/89 |
| 6,034,650 A * | 3/2000 | Kuramoto | 343/895 |
| 6,150,984 A * | 11/2000 | Suguro et al. | 343/702 |
| 6,181,295 B1 * | 1/2001 | Sharaha et al. | 343/895 |
| 6,198,449 B1 * | 3/2001 | Muhlhauser et al. | 343/753 |
| 6,229,499 B1 * | 5/2001 | Licul et al. | 343/895 |
| 6,252,562 B1 * | 6/2001 | Diez | 343/895 |

FOREIGN PATENT DOCUMENTS

| | | |
|---|---|---|
| EP | 0847103 | 6/1998 |
| WO | WO97/06579 | 2/1997 |
| WO | WO97/11507 | 3/1997 |
| WO | WO98/28815 | 7/1998 |

* cited by examiner

*Primary Examiner*—Tan Ho
(74) *Attorney, Agent, or Firm*—Jacobson Holman, PLLC

(57) ABSTRACT

A method for controlling the radiation pattern of an antenna means comprising N helically configured radiating elements, where N is an integer greater than 1, an antenna system, comprising N helically configured radiating elements, and a radio communication device including such an antenna system. In the method, at least one property of at least one received signal from at least one of the radiating elements is measured, and at least one of the parameters phase ($\phi_n$) and amplitude ($A_n$) for received signals and/or signals to be transmitted for at least one of the radiating elements is controlled as a response to the measured property of said received signal. The antenna system comprises means for controlling at least one of the parameters phase (($\phi_n$) and amplitude ($A_n$) for signals received and/or signals to be transmitted by at least one of the antenna elements.

25 Claims, 12 Drawing Sheets

METHOD FOR CONTROLLING THE RADIATION PATTERN OF AN ANTENNA MEANS, AN ANTENNA SYSTEM AND A RADIO COMMUNICATION DEVICE

FIELD OF THE INVENTION

The invention relates to a method for controlling the radiation pattern of an antenna means comprising N helically configured radiating elements, where N is an integer greater than 1, and being adapted for transmitting and/or receiving RF signals. It also relates to an antenna system for transmission/reception of RF signals, comprising N helically configured antenna elements, where N is an integer greater than 1, and being adapted for transmitting and/or receiving RF signals. The invention further relates to a radio communication device including such an antenna system.

BACKGROUND OF THE INVENTION AND RELATED ART

For antenna applications where a hemispherical coverage with circular polarization is desired, a quadrifilar helix antenna (QHA) can be used. An advantage of the QHA is the ability to shape the radiation pattern from a narrow axial beam to a very broad beam covering almost the entire sphere. The pattern can also be designed to have peaks and dips at certain angles. This is done by exciting different radiation modes, axial and/or radial ones.

A QHA consists of four wires wound around a cylindrical or conical surface with a constant pitch angle. Usually, when space is limited, the choice is a narrow and short cylindrical QHA, having three degrees of freedom (e.g. diameter, pitch angle, length). Allowing the surface to be conical gives one extra degree of freedom, and can significantly increase the bandwidth.

Modifications can be added to the helices to achieve certain features. Each helix can for example be split in two, the halves having different lengths, for double tuning. Also, if the circumference is large enough, the helices can be meandered to reduce the length of the antenna. A QHA is fed at either the bottom or the top end by means of a feed network.

Several quadrifilar helix antennas (QHA), are known from patents and published patent applications. A large number of these disclose quadrifilar antenna structures for circularly polarized radio signals. See, for example, WO 98/28815, WO 97/06579, WO 97/11507, U.S. Pat. No. 5,191,352, U.S. Pat. No. 5,255,005, and U.S. Pat. No. 5,541,617.

Figure 1:
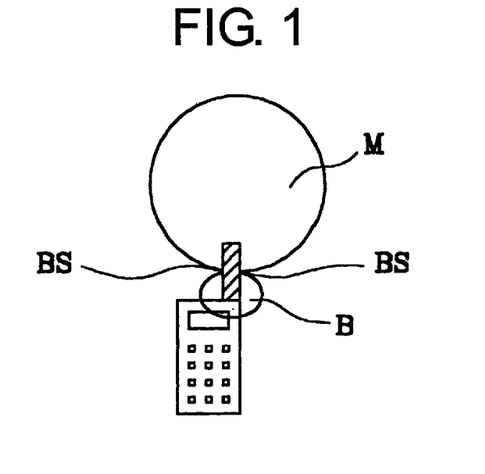
FIG. 1 shows a typical radiation pattern of an N-filar antenna device.

In all those antenna structures, helical elements are fed with constant amplitude and constant phase-shift between the helical elements. FIG. 1 shows a typical radiation pattern of such an antenna structure mounted to a portable radiotelephone. The radiation pattern exhibits a main lobe M directed upwards and, in most cases, a minor back lobe B directed downwards when fed with a progressive phase-shift adapted to the rotational directions of the helical elements. Between the lobes, the radiation pattern has a blind sector or null BS, where reception/transmission cannot be performed.

In order to direct the main antenna lobe towards a transmitter/receiver (e.g. a satellite) with which a radio communication device is to communicate, telephones having an antenna structure mounted to the telephone housing with a pivot joint have for example been provided. The orientation of the antenna structure can then be adjusted manually for good signal transmission/reception. New adjustments can take place when the transmitter/receiver has changed location or when the telephone has been moved. An example of an antenna structure mounted with a pivoting joint to a telephone is disclosed in U.S. Pat. No. 5,628,057.

SUMMARY OF THE INVENTION

In this disclosure it is to be understood that the antenna system of the invention is operable to receive or receive and transmit radio signals. Even if a term is used herein that suggests one specific signal direction it is to be appreciated that such a situation can cover that signal direction and/or its reverse.

A main object of the invention is to provide a method for controlling the radiation pattern of an antenna means comprising N helically configured radiating elements (NHA), in response to signals received.

Another object of the invention is to provide a method for controlling the radiation pattern of an antenna means comprising N helically configured radiating elements (NHA), by which method blind sectors in the radiation pattern can be avoided.

A further object of the invention is to provide a method for controlling the radiation pattern of an antenna means comprising N helically configured radiating elements (NHA), by which method the radiation pattern can be adapted to optimal reception/transmission.

These and other objects are attained by a method according to the appended method claims.

The invention further provides a method for controlling the radiation pattern of an antenna means comprising N helically configured radiating elements (NHA), by which method the radiation pattern can be controlled during reception and/or transmission.

The invention further provides a method for controlling the radiation pattern of an antenna means comprising N helically configured radiating elements (NHA), by which method the sensitivity to antenna orientation and transmitter/receiver position can be reduced.

The invention further provides a method for controlling the radiation pattern of an antenna means comprising N helically configured radiating elements (NHA), by which method the performance of the antenna means in stowed position can be improved.

The invention further provides a method for controlling the radiation pattern of an antenna means comprising N helically configured radiating elements (NHA), by which method the average signal and signal-to-noise ratio can be improved.

The invention further provides a method for controlling the radiation pattern of an antenna means comprising N helically configured radiating elements (NHA), by which method the sensitivity to mechanical tolerances in the antenna means can be reduced.

A further main object of the invention is to provide an antenna system comprising N helically configured antenna elements, with which antenna system the radiation pattern can be controlled.

Another object of the invention is to provide an antenna system, with which blind sectors in the radiation pattern can be avoided.

Another object of the invention is to provide an antenna system, with which the radiation pattern can be adapted to optimal reception/transmission.

These and other objects are attained by an antenna system according to the appended system claims.

The invention further provides an antenna system, by which the radiation pattern can be controlled during reception and/or transmission.

The invention further provides an antenna system, in which the sensitivity to antenna orientation and transmitter/receiver position can be reduced.

The invention further provides an antenna system, by which the performance of the antenna system with the radiating elements in stowed position can be improved.

The invention further provides an antenna system, by which the average signal and signal-to-noise ratio can be improved.

The invention further provides an antenna system, in which the sensitivity to mechanical tolerances can be reduced.

A further main object of the invention is to provide a radio communication device having an antenna system with the above mentioned objects.

These and other objects are attained by a radio communication device according to the appended claims concerning a radio communication device.

DESCRIPTION OF PREFERRED EMBODIMENTS

It should be noted that similar or corresponding parts have been given the same reference numerals throughout the drawings.

Figure 2:
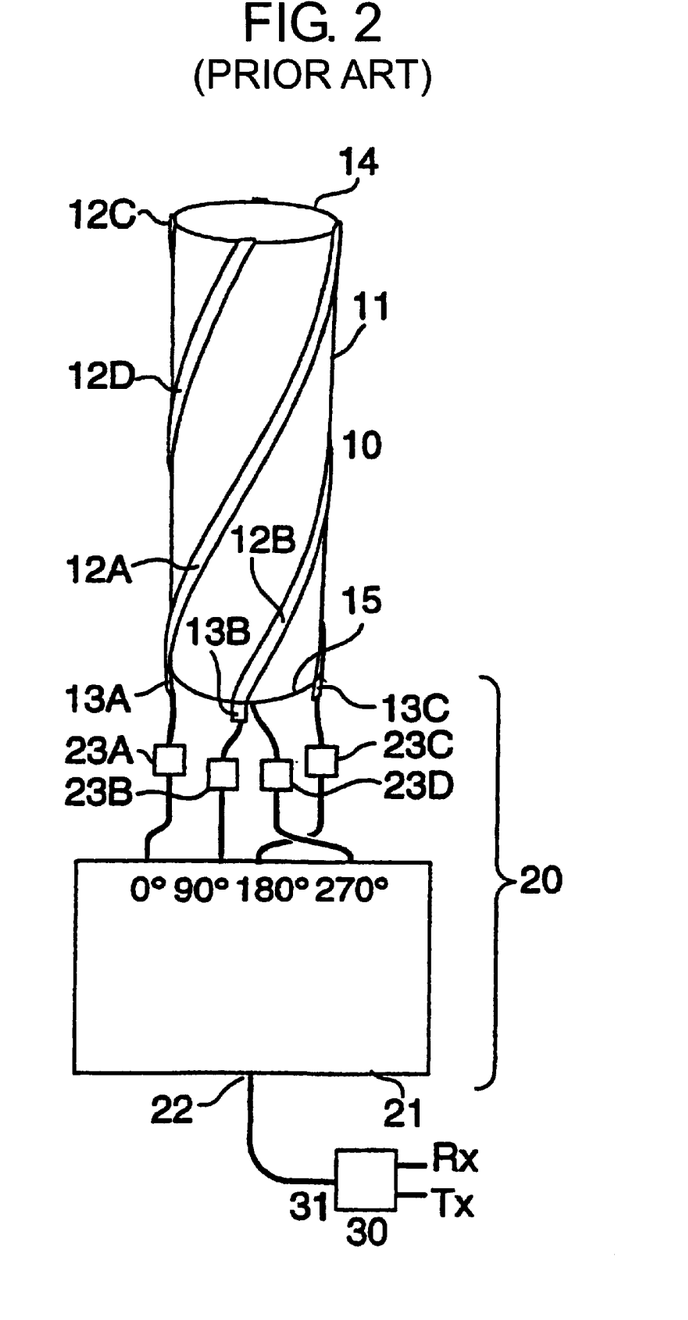
FIG. 2 shows schematically a quadrifilar antenna device with a typical feeding network according to the prior art.

With reference to FIG. 2, an example of a known antenna system including an antenna device and feed device for transmitting and receiving circularly polarized RF waves in connection to a radio communication device, is diagrammatically shown. It includes a radiating structure 10, which comprises a support 11, which carries four conductive helical radiating elements 12A–D, which are coextending and coaxially arranged.

The so formed quadrifilar radiating structure 10 has a first end 15 and a second end 14. At the first end 15, the helical radiating elements 12A–D are provided with a respective feed point, or feed portion 13A–D.

A feeding means 20 is connected to the radiating structure 10, for feeding and reception of signals. The feeding means 20 possibly comprises a diplexer 30 having an input Tx for signals to be transmitted by the antenna system and comes from the transceiver circuits of the radio communication device, and an output Rx for signals received by the antenna system to be transmitted to the transceiver circuits of the radio communication device. The output 31 of the diplexer 30 or the output of the transceiver circuits of the radio communication device is connected to a phasing network 21. The phasing network comprises means for dividing the signals input at input 22 into signals being phase shifted 0°, 90°, 180° and 270°, respectively. Each of the outputs of the phasing network 21 is connected, possibly via matching means 23A–D, with a respective feed portion 13A–D, so as to obtain a progressive phase shift on the feed portions 13A–D. A signal put on the Tx input of the diplexer and so divided into phase shifted signals and fed to the radiating structure 10 will create a circularly polarized RF wave to be radiated by the radiating structure 10.

Since the radiating structure 10 and the feeding means 20 are passive, they will operate reverse when receiving a circularly polarized RF wave polarized in the same direction.

The so described antenna device and feed device can be used for radio communication in systems using satellites, and also for receiving signals in positioning systems using satellites, e.g. GPS.

Since the phasing network 21 gives a fixed phase shift between its outputs, the radiation pattern of the radiating structure 10 will be fixed, as shown in FIG. 1, and can only be adjusted by changing the orientation of the radiating structure 10, e.g. when the radiating structure 10 is attached with a pivoting joint.

Figure 3:
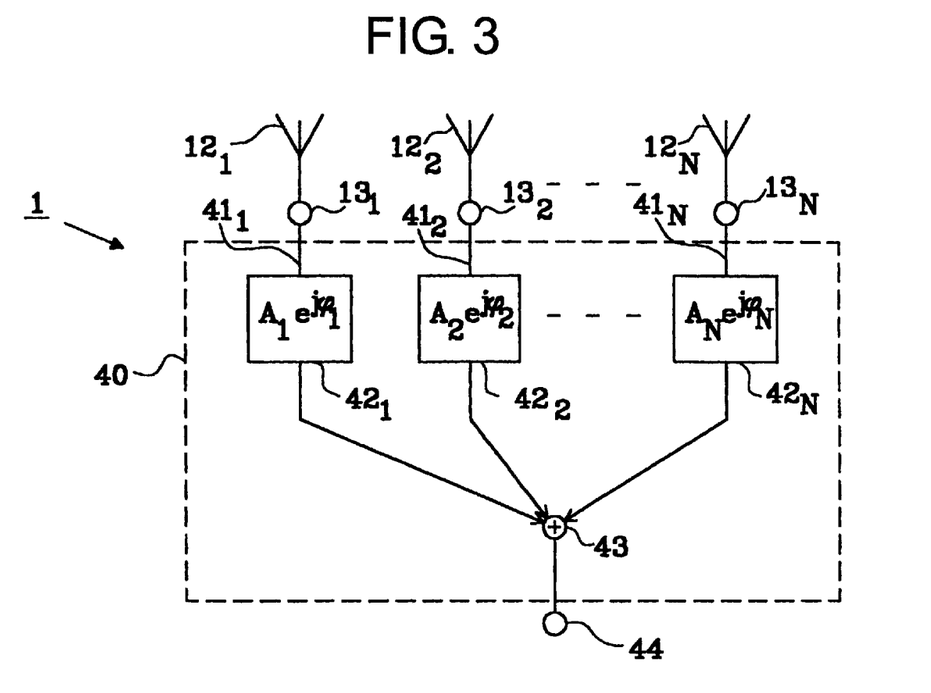
FIG. 3 shows a first embodiment of an antenna system according to the invention.

FIG. 3 shows a first embodiment of an antenna system 1 according to the invention comprising N radiating elements $12_1$–$12_N$, where N is an integer greater than 1. The radiating elements $12_1$–$12_N$ are preferably helically configured, similarly to what is shown in FIG. 2. By helically configured, in this application, is meant a generally helical configuration, with a radiating structure 10, as shown in FIG. 2, which can have a circular or other than a circular cross section, e.g. of an oval or a polygon and including cross sections being constant as well as cross sections not being constant along a longitudinal axis of the radiating structure 10 (e.g. conical NHA). Each radiating element $12_1$–$12_N$ is connected at its feed portion $13_1$–$13_N$ to one of N ports $41_1$–$41_N$ of a feed device 40. Each of ports $41_1$–$41_N$ is constituted of a first port of an adaptive feed means $42_1$–$42_N$. The other port of each adaptive feed means $42_1$–$42_N$ is connected to a power combiner/divider 43, which is connected to the antenna port 44. The antenna port 44 is to be connected to transceiver circuits of a radio communication device.

Figure 4:
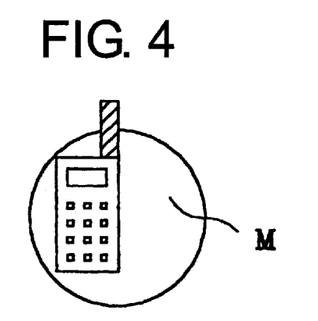
FIG. 4 shows the radiation pattern of an embodiment of an antenna system according to the invention where the phases are reversed in respect of the phases for "normal feed".
Figure 5:
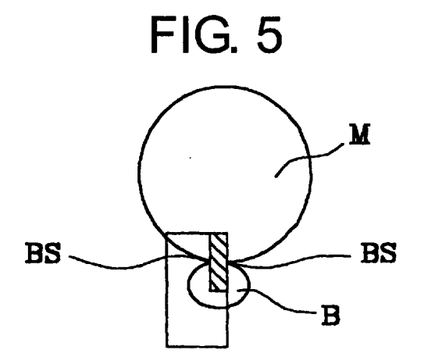
FIG. 5 shows the radiation pattern of an embodiment of an antenna system according to the invention where the phases are reversed in respect of the phases for "normal feed" when the radiating structure is stowed away in an upside down position.

Each adaptive feed means $42_1$–$42_N$ transforms (i.e. multiplies) a signal incoming on one of its ports by a function $A_n e^{j\phi n}$ to a signal output on the other port, i.e. both signals received by any one of the radiating elements and signals to be transmitted by the same radiating element are transformed by the same function. $A_n$ is an attenuation or amplification factor (hereafter called the amplitude) and $\phi_n$ is a phase shift for the respective adaptive feed means. By adjusting at least one of $A_n$ and $\phi_n$, the radiation pattern of the radiating elements $12_1-12_N$ can be controlled or adjusted. If for example the phases are reversed in respect of the phases for "normal feed" (when the radiating elements $12_1-12_N$ are fed with progressive phase shift adapted to the rotational directions of the helical radiating elements $12_1-12_N$) the radiation pattern is changed so that the main lobe M moved to be directed in the opposite direction, as shown in FIG. 4. This can be very advantageous if the radiating elements $12_1-12_N$ are supported by a radiating structure 10, which is attached to a telephone body by a pivot joint. When the radiating structure 10 is stowed away in standby position the radiation pattern can be controlled for maximal reception/transmission, as illustrated in FIG. 5. The change of the phase can be mechanically actuated when the radiating structure 10 is brought to its stowed position, or the chance of the phase can take place continuously.

Figure 6:
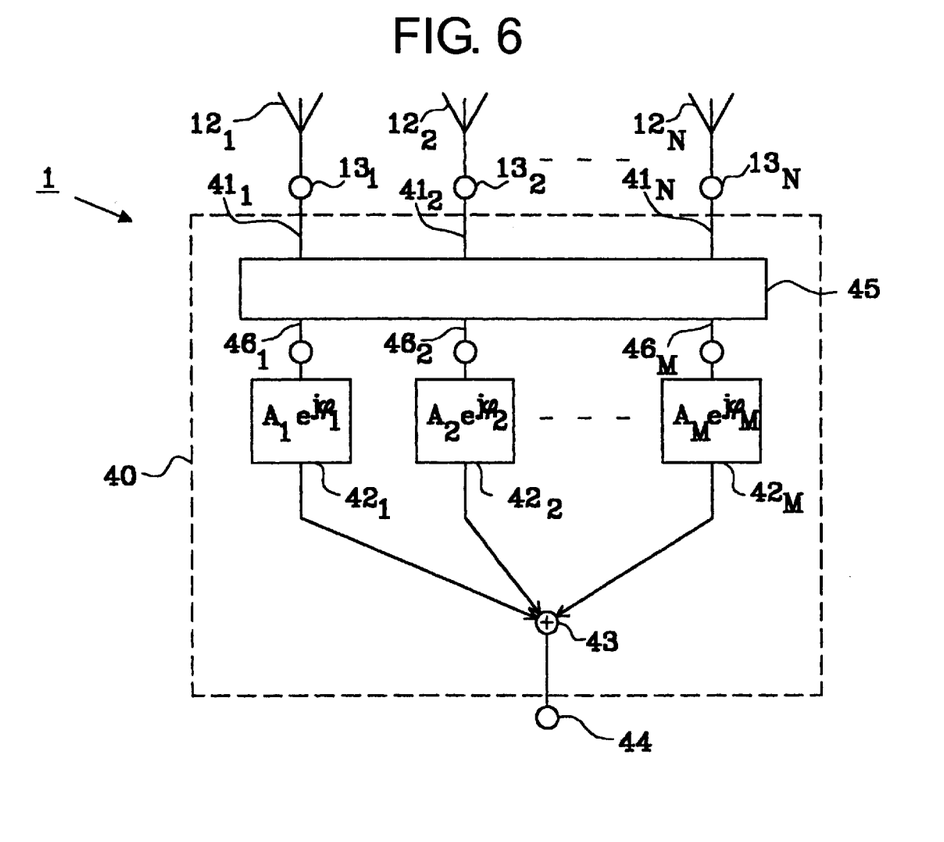
FIG. 6 shows an antenna system according to a second embodiment of the invention.

In FIG. 6 an antenna system according to a second embodiment of the invention and similar to that shown in FIG. 3 is shown. In this embodiment the feed device 40 also includes a fixed feed network 45, having N element ports $41_1-41_N$ connected to the N radiating elements $12_1-12_N$. The feed device 40 further includes M adaptive feed means $42_1-42_M$ connected to M feed ports $46_1-46_M$ of the fixed feed network 45, where M is an integer greater than 1, which could be equal to N. When M=N the fixed feed network 45 can comprise N conductors connecting each of the feed ports $46_1-46_M$ with a corresponding element port $41_1-41_N$. The fixed feed network 45 can be formed so that the phase and/or amplitude on the element ports $41_1-41_N$, for controlling the radiation pattern of the radiating elements $12_1-12_N$, can be varied by varying the phase and/or amplitude on the feed ports $46_1-46_M$ by means of the adaptive feed means $42_1-42_M$. The fixed feed network 45 can for example be formed so that the phase and/or amplitude on the element ports $41_1-41_N$, will cause that the radiation pattern of the radiating elements $12_1-12_N$ can be switched between different pre-selected radiation patterns by applying signals on one of the feed ports $46_1-46_M$ only, and changing port on which signals are input. In this case $A_m$ is set to zero for all of the adaptive feed means $42_1-42_M$ but one. The operation in transmission is the opposite as the described receiving operation.

Figure 7:
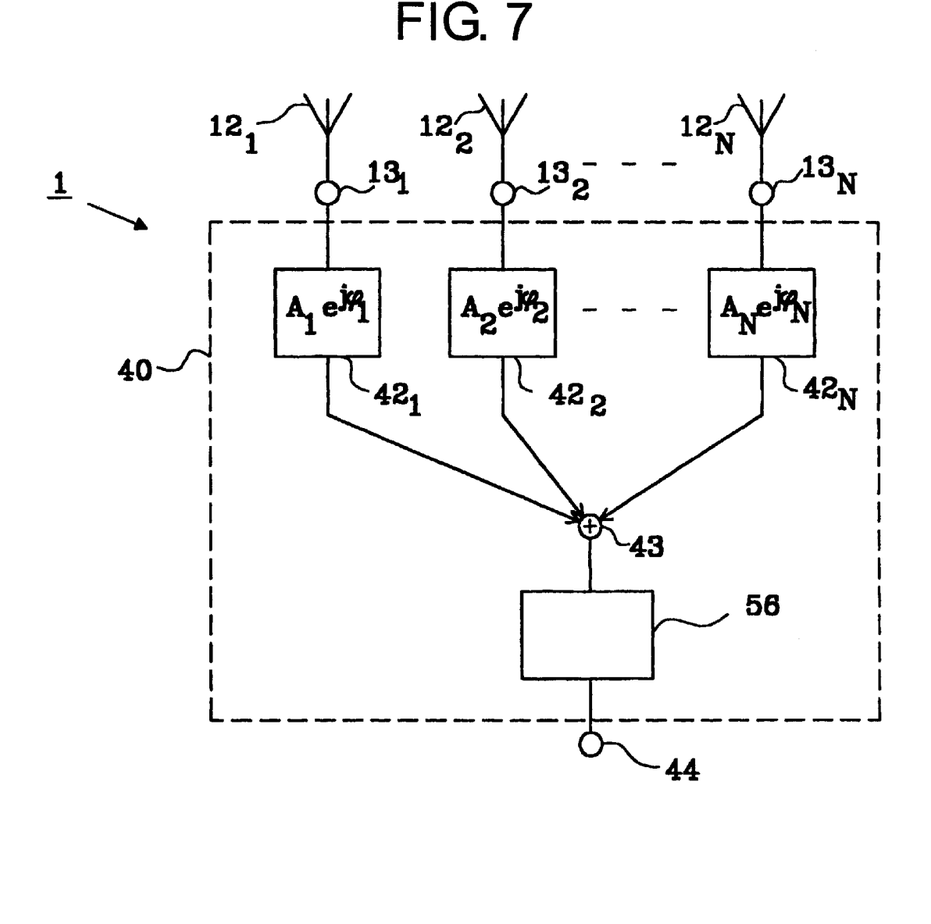
FIGS. 7 and 8 show different possibilities how the $T_x/R_x$ chain(s) can be included in an antenna system according to the invention.
Figure 8:
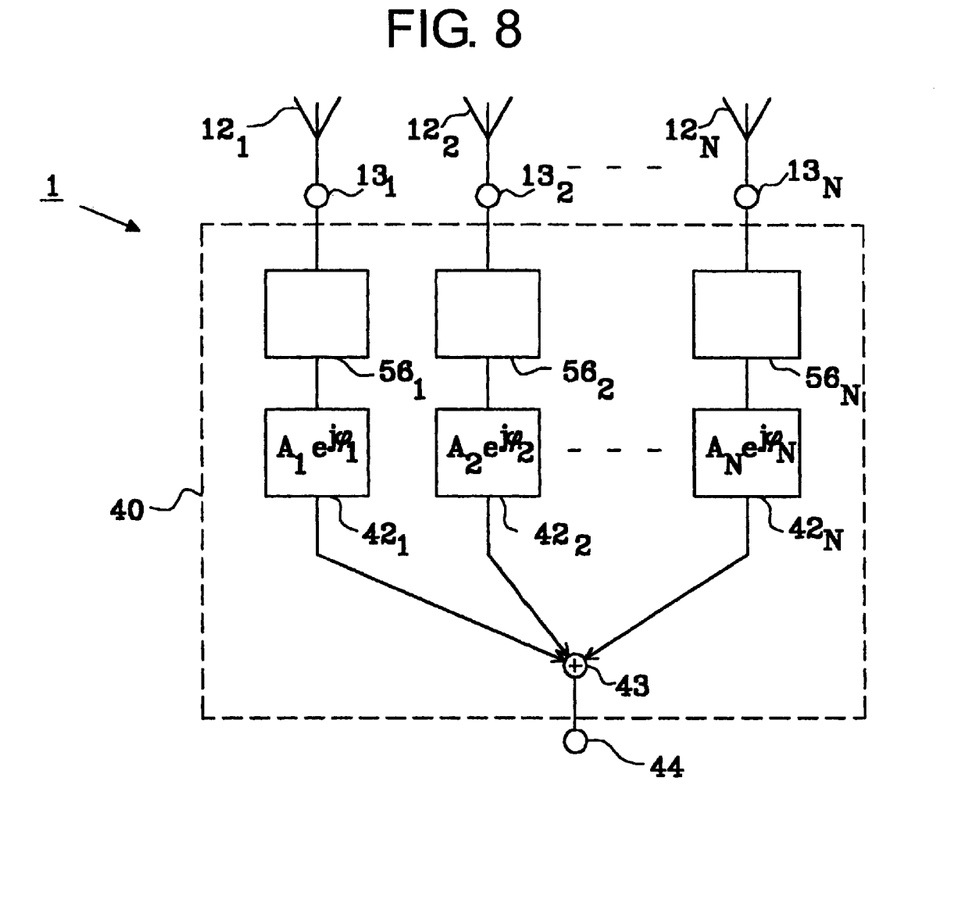

FIGS. 7 and 8 show different possibilities how the $T_x/R_x$ chain(s) 56, $56_1-56_N$ can be included in an antenna system according to the invention. As illustrated, the received signals and/or signals to be transmitted can be processed in the $T_x/R_x$ chain(s) after or before being combined or divided, respectively. It is also possible that the $T_x/R_x$ chain(s) is (are) divided so that components thereof are distributed at the locations shown and also intermediate positions.

Figure 9:
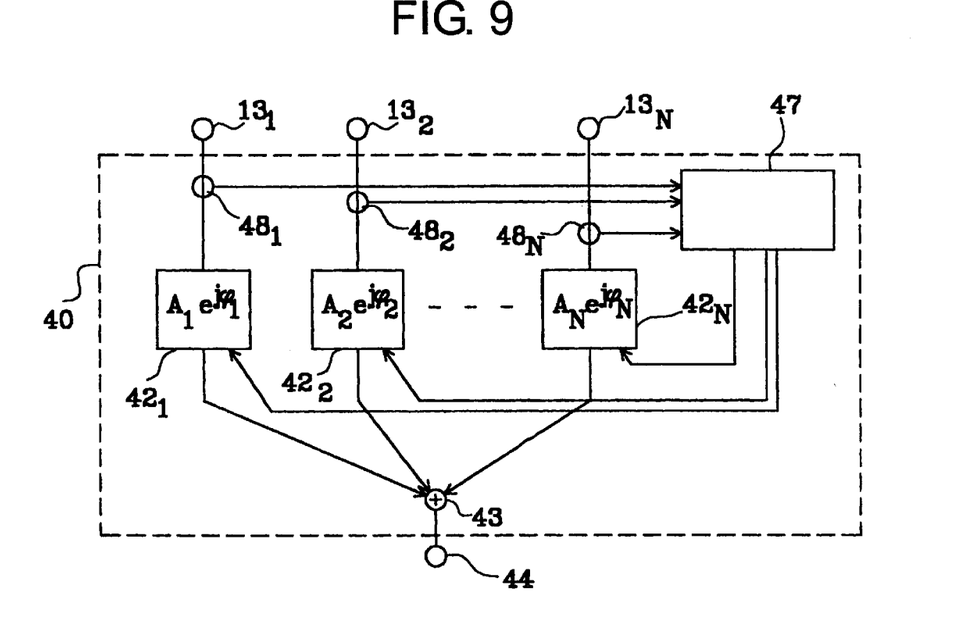
FIG. 9 shows a third embodiment of an antenna system according to the invention.

In FIG. 9 a third embodiment of the invention is shown. The signals received by the radiating elements $12_1-12_N$ are sensed in each line between the radiating elements $12_1-12_N$ and its associated adaptive feed means $42_1-42_N$, by means of sensors or couplers $48_1-48_N$, and measured in a sense and control circuit/algorithm means 47, also called control means 47 in this disclosure. In this control means 47, the signal strength and/or phase of each signal received by the radiating elements $12_1-12_N$ is measured, and the amplitude $A_n$ and/or the phase $\phi_n$ for the received signals and/or signals to be transmitted is controlled in the respective adaptive feed means $42_1-42_N$, in order to obtain a desired radiation pattern, preferably for optimal reception/transmission. The value of the measured signal strength and/or phase of each signal received by the radiating elements $12_1-12_N$ can for example be compared with a reference value stored in the control means 47. The reference values can represent signal strengths and/or phases for received signals in the respective radiating elements $12_1-12_N$ for different orientations of the transmitter (e.g. a satellite) of the received signals in relation to the radiating elements. The reference values can represent signal strengths and/or phases for received signals in the respective radiating elements $12_1-12_N$ from earlier measurements which are stored in the sense and control circuit/algorithm means 47, preferably stored with the corresponding values of the parameters phase $\phi_n$ and amplitude $A_n$. Alternatively, the values of the signal strengths and/or phases for the received signals in the respective radiating elements $12_1-12_N$ can be compared to each other and the amplitude $A_n$ and/or the phase $\phi_n$ for the received signals and/or signals to be transmitted is (are) controlled in the respective adaptive feed means $42_1-42_N$ according to these comparisons in order to obtain a desired radiation pattern, preferably for optimal reception/transmission. The measurements and the control are preferably repeated after certain periods of time or performed continuously.

Figure 10:
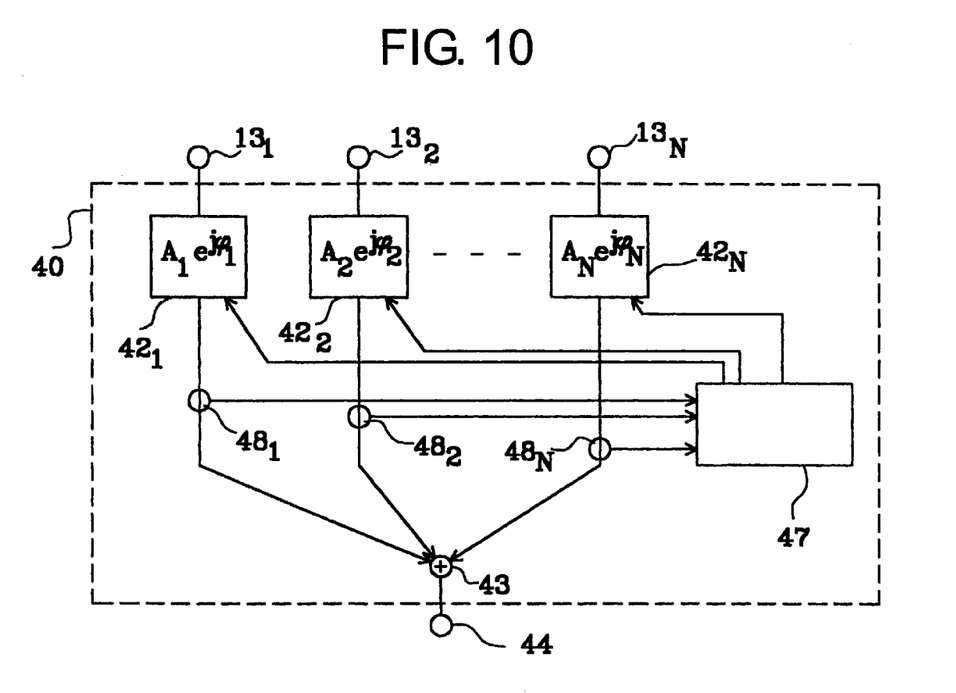
FIG. 10 shows a fourth embodiment of an antenna system according to the invention.

FIG. 10 shows a fourth embodiment of the invention similar to that of FIG. 9. Here, the signals received by the radiating elements $12_1-12_N$ are sensed, by means of sensors or couplers $48_1-48_N$, in each line between the respective adaptive feed means $42_1-42_N$ and the power combiner/divider 43. This means that the signals that are sensed have been transformed by the adaptive feed means $42_1-42_N$. The sensed signals are measured in a sense and control circuit/algorithm means 47. In this control means 47 the signal strength and/or phase of each signal received by the radiating elements $12_1-12_N$ is measured, and the amplitude $A_n$ and/or the phase $\phi_n$ for the received signals and/or signals to be transmitted is controlled in the respective adaptive feed means $42_1-42_N$, in order to obtain a desired radiation pattern, preferably for optimal reception/transmission. The values of the measured signals are preferably compared with reference values for the control. The reference values can represent signal strengths and/or phases for received signals in the respective radiating elements $12_1-12_N$ from earlier measurements which are stored in the sense and control circuit/algorithm means 47, preferably stored with the corresponding values of the parameters phase $\phi_n$ and amplitude $A_n$. Preferably at least one of the parameters phase $\phi_n$ and amplitude $A_n$ for the adaptive feed means $42_1-42_N$ is changed, e.g. one parameter at a time for one adaptive feed means $42_1-42_N$ at a time, in steps or continuously, at predetermined or randomly selected times, and the signal strengths and/or phases of the sensed signals with the different values of the parameters phase $\phi_n$ and amplitude $A_n$ for the adaptive feed means $42_1-42_N$, preferably all N at the same time, are measured. The value of the measured signal strength and/or phase of each sensed signal can for example be compared to a reference value stored in the control means 47, and the amplitude $A_n$ and/or the phase $\phi_n$ for the received signals and/or signals to be transmitted is controlled in the respective adaptive feed means $42_1-42_N$, in order to obtain a desired radiation pattern for optimal reception/transmission. Preferably a signal, or set of N signals, sensed and measured after a change of a parameter phases $\phi_n$ and/or amplitude $A_n$ is compared to the previous value and the parameter(s) is (are) then set to the value of the parameter giving the optimal value of the sensed and measured signal, or set of N signals, for a period of time, after which the change of parameter(s) and measurement(s) continues. Alternatively, the values of the signal strengths and/or phases for the received signals in the respective radiating elements $12_1$–$12_N$ can be compared to each other and the amplitude $A_n$ and/or the phase $\phi_n$ for the received signals and/or signals to be transmitted is (are) controlled in the respective adaptive feed means $42_1$–$42_N$ according to these comparisons in order to obtain a desired radiation pattern, preferably for optimal reception/transmission. The measurements and the control are preferably repeated after certain periods of time or performed continuously.

Figure 11:
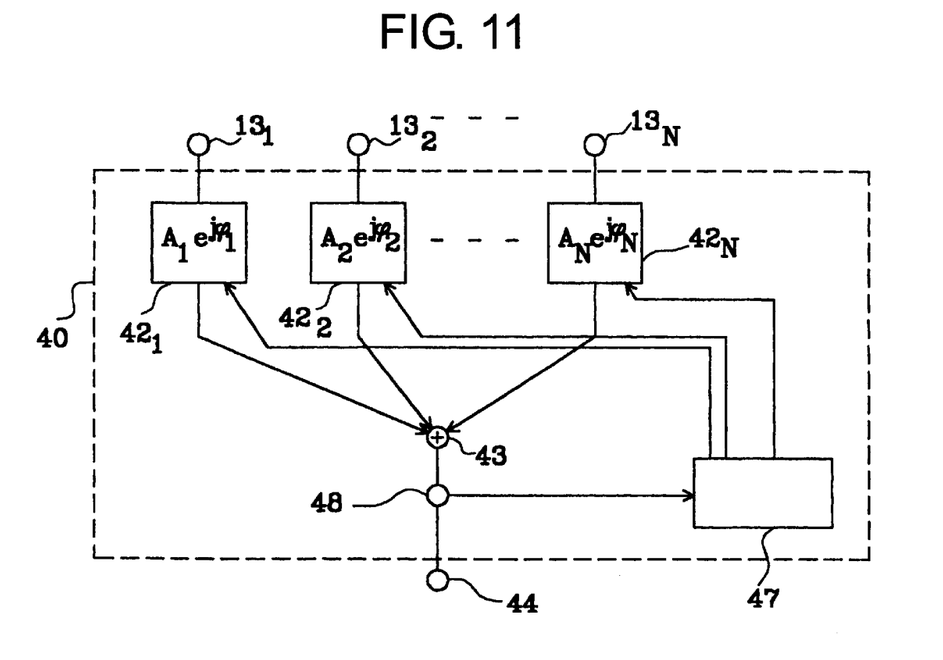
FIG. 11 shows a fifth embodiment of an antenna system according to the invention.

In FIG. 11 a fifth embodiment of the invention, similar to that of FIG. 10, is shown. In this embodiment the received signals are sensed and measured after combination. Here, it is preferred that at least one of the parameters phase $\phi_n$ and amplitude $A_n$ for the adaptive feed means $42_1$–$42_N$ is changed, e.g. one parameter at a time for one adaptive feed means $42_1$–$42_N$ at a time in steps or continuously at predetermined or randomly selected times, and the signal strength of the sensed signals with the different values of the parameters phase $\phi_n$ and amplitude $A_n$ for the adaptive feed means $42_1$–$42_N$ are measured. The value of the measured signal strength of a sensed signal can for example be compared to a reference value stored in the control means 47, and the amplitude $A_n$ and/or the phase $\phi_n$ for the received signals and/or signals to be transmitted is controlled in the respective adaptive feed means $42_1$–$42_N$, in order to obtain a desired radiation pattern for optimal reception/transmission. Preferably a signal sensed and measured after a change of a parameter phase $\phi_n$ and/or amplitude $A_n$ is compared to the previous value and the parameter is then set to the value of the parameter giving the optimal value of the sensed and measured signal for a period of time, after which the change of parameter(s) and measurement(s) continues. The measurement(s) and the control are preferably repeated after certain periods of time or performed continuously.

Figure 12:
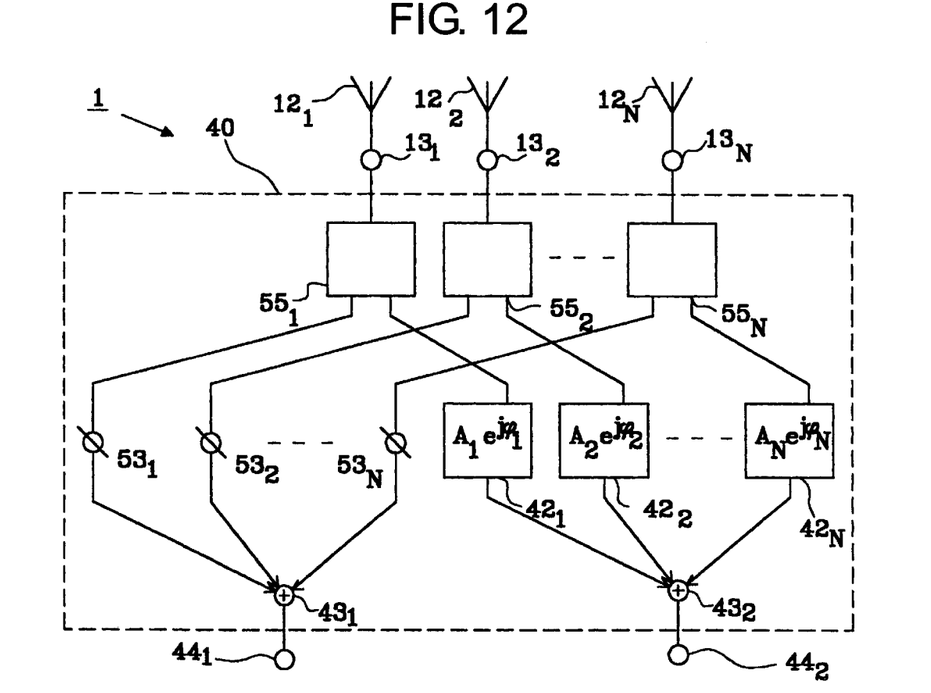
FIG. 12 shows how the received signals and signals to be transmitted can be separated in two links.

FIG. 12 shows how the received signals and signals to be transmitted can be separated in two links by means of duplex filters $55_1$–$55_N$, connected to the radiating elements $12_1$–$12_N$. In one link, the antenna port $44_1$ is connected to the "input" port of the power combiner/divider $43_1$, and the N "output" ports thereof are connected to their respective N duplex filters $55_1$–$55_N$, via fixed phase shifters $53_1$–$53_N$. In the other link, the antenna port $44_2$ is connected to the "input" port of the power combiner/divider $43_2$, and the N "output" ports thereof are connected to their respective N duplex filters $55_1$–$55_N$, via adaptive feed means $42_1$–$42_N$. Here, any of the two links can be used for received signals, while the other is used for signals to be transmitted. The received signals can be measured and the adaptive feed means $42_1$–$42_N$ can be controlled in any of the ways described in the other embodiments or examples.

Figure 13:
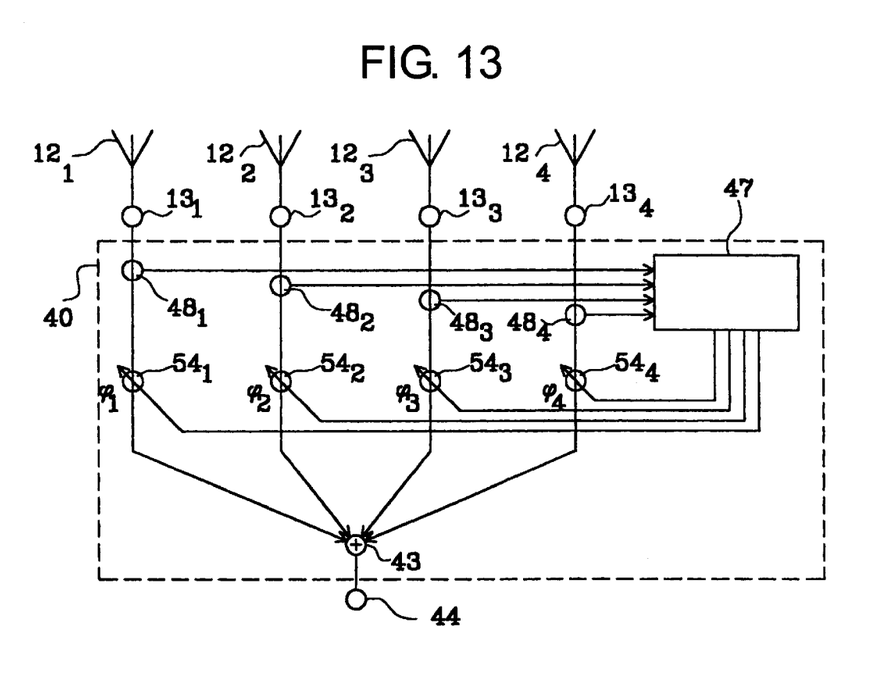
FIG. 13 shows a "software" example of the embodiment according to FIG. 9.

FIG. 13 shows a "software" example of the embodiment according to FIG. 9. This is an example of selection combining between two axial lobes. Here N=4, and a portion of each of the signals received in the radiating elements $12_1$–$12_4$ is tapped-off and input to the sense and control circuit/algorithm means 47, where each signal is measured and processed according to an algorithm for the control. Signals output from the sense and control circuit/algorithm means 47 are input on each of the adaptive feed means $54_1$–$54_4$, for controlling the phase shift $\phi_n$. The adaptive feed means $54_1$–$54_4$ are in this case constituted of variable phase shifters, which varies the phase in steps or continuously. For the understanding of the operation of this embodiment we define two vectors, which represent two lobes, $\vec{b}_1$, $\vec{b}_2$, one directed upwards and one directed downwards (the opposite direction) as:

$$\begin{cases} \vec{b}_1 = \hat{u}_1 + j\hat{u}_2 - \hat{u}_3 - j\hat{u}_4 \\ \vec{b}_2 = \hat{u}_1 - j\hat{u}_2 - \hat{u}_3 + j\hat{u}_4 \end{cases}$$

where the signals from the four radiating elements $12_1$–$12_4$ forms a four-dimensional vector, where $\hat{u}_k$ is the unit vector corresponding to radiating element $12_k$. The received signals on the radiating elements $12_1$–$12_4$ are read by the sense and control circuit/algorithm means 47 by means of sensors $48_1$–$48_4$, and formed into a vector $\vec{v}$ according to:

$$\vec{v} = v_1\hat{u}_1 + v_2\hat{u}_2 + v_3\hat{u}_3 + v_4\hat{u}_4$$

where $v_k$ is the complex signal value of a signal received in radiating element $12_k$. Two signals $s_1$, $s_2$ are then calculated, representing the signal strength in the two lobes $\vec{b}_1$, $\vec{b}_2$, respectively:

$$\begin{cases} s_1 = |\vec{v} \cdot \vec{b}_1| \\ s_2 = |\vec{v} \cdot \vec{b}_2| \end{cases}$$

The levels of the two signals $s_1$, $s_2$ are compared in the sense and control circuit/algorithm means 47, which decides which phase shift should be loaded to the variable phase shifters $54_1$–$54_4$ so that if $s_1 > s_2$, the $$\text{phase shitfs:} \begin{cases} \varphi_1 = 0° \\ \varphi_2 = 90° \\ \varphi_3 = 180° \\ \varphi_4 = -90° \end{cases}$$

will be loaded to the respective variable phase shifter $54_1$–$54_4$, and if $s_2 > s_1$, the $$\text{phase shitfs:} \begin{cases} \varphi_1 = 0° \\ \varphi_2 = -90° \\ \varphi_3 = 180° \\ \varphi_4 = 90° \end{cases}$$

will be loaded to the respective variable phase shifter $54_1$–$54_4$. The measurement and the control process is preferably repeated after certain periods of time or performed continuously. In this embodiment both received signals and signals to be transmitted will be phase shifted in the phase shifters $54_1$–$54_4$ before and after entering and exiting the power combiner/divider 43, respectively. The antenna port 44, which is connected to the power combiner/divider 43 is also connected to the transceiver circuits of the radio communication device. Alternatively the sensors $48_1$–$48_4$, the sense and control circuit/algorithm means 47, and the phase shifters $54_1$–$54_4$ can be included in the telephone circuitry, and then the feed portions $13_1$–$13_4$ are connected with the telephone circuitry, preferably to connections on the PCB (printed circuit board) of the telephone circuitry.

Figure 14:
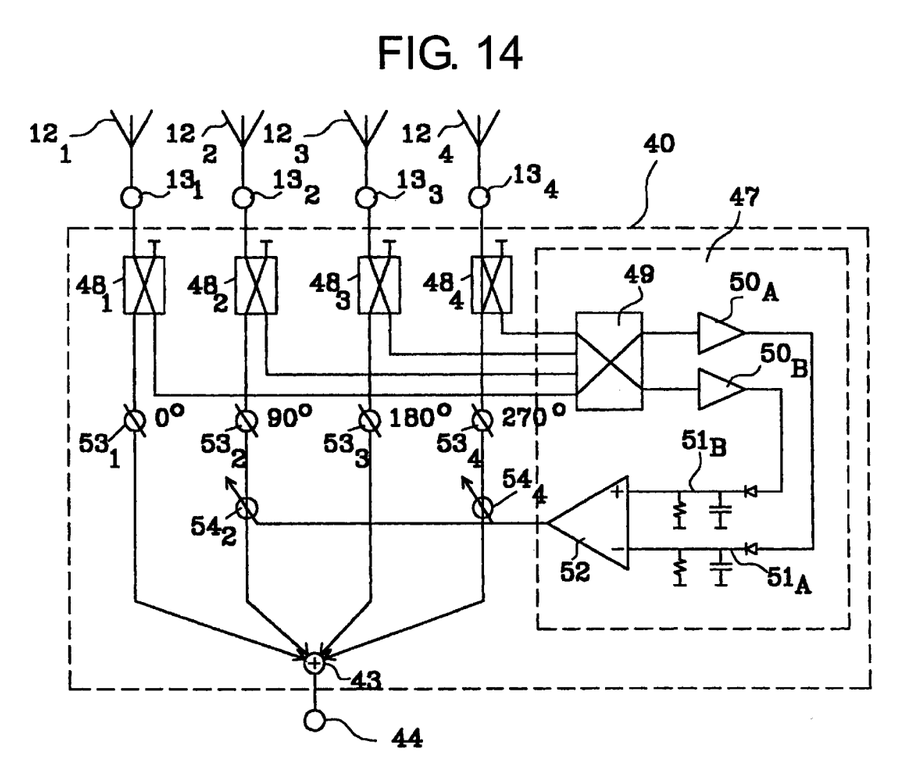
FIG. 14 shows a "hardware" example of the embodiment according to FIG. 9.

FIG. 14 shows a "hardware" example of the embodiment according to FIG. 9. This is also an example of select-combining with two axial lobes. Also here N=4, and a portion of each of the signals received in the radiating elements $12_1$–$12_4$ is tapped-off and input to the sense and control circuit/algorithm means 47, where the signals are measured and processed to provide output signals, which are input on each of the adaptive feed means $54_2$, $54_4$, for controlling the phase shift $\phi_n$. In this case, only two adaptive feed means $54_2$, $54_4$ are present, and they are constituted of variable phase shifters, which varies the phase shift with the steps 0° and 180°. Also fixed phase shifters $53_1$–$53_4$ are arranged between the sensors and the power combiner/divider for phase shifting the signals to/from the radiating elements $12_1$–$12_N$ 0°, 90°, 180°, 270°, respectively. The sensors $48_1$–$48_4$ are here constituted of directional couplers $48_1$–$48_4$ tapping off a portion of the received signals to be input on the inputs of the sense and control circuit/algorithm means 47. This control means 47 comprises a phase quadrature hybrid 49, having one input port for each directional coupler $48_1$–$48_4$. Each of the two outputs of the phase quadrature hybrid 49 is connected to amplifiers $50_A$, $50_B$ for amplification of the signals. Each of the two amplified signals is then fed to a comparator 52 via integrators $50_A$, $50_B$. Depending on which of the two signals input to the comparator is the highest, the output will be a logical 0 or a logical 1. The output of the comparator is connected to the two phase shifters $42_2$, $42_4$ and depending on if a logical 0 or a logical 1 is input to the phase shifters $42_2$, $42_4$, the phase shift will be set to 0° or 180°.

In the embodiments above, the $T_x$/$R_x$ chains can be included in the respective antenna system, as described in connection with FIGS. 7 and 8.

Figure 15:
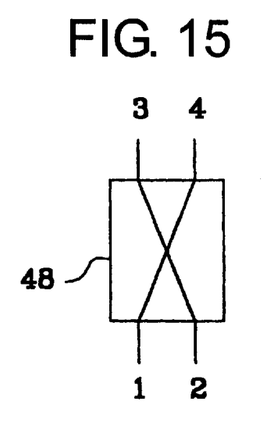
FIG. 15 shows a directional coupler used in the example of FIG. 14.

FIG. 15 shows a directional coupler 48 of the kind used in the previous embodiment, of FIG. 14, with its port designation. The scattering matrix, which shows the transformation of complex input signals to complex output signals is shown in the following formula:

$$S = (e^{jx}) \cdot \begin{bmatrix} 0 & 0 & \sqrt{1-p} & -j\sqrt{p} \\ 0 & 0 & -j\sqrt{p} & \sqrt{1-p} \\ \sqrt{1-p} & -j\sqrt{p} & 0 & 0 \\ -j\sqrt{p} & \sqrt{1-p} & 0 & 0 \end{bmatrix}$$

where the transformation of a signal input on port c (column c) and output on port 1 (line 1) is given by the matrix. In the formula, x denotes an arbitrary phase. In the matrix, p denotes the coupled portion. If p is selected to 0.1, 10% of the signal power (−10 dB) is tapped off for the control.

Figure 16:
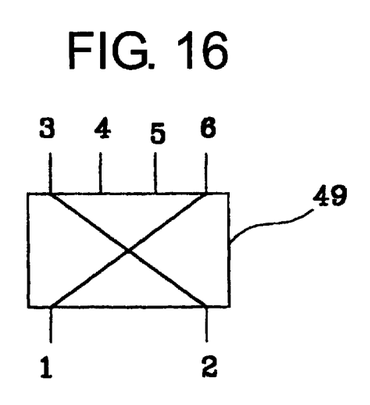
FIG. 16 shows a phase quadrature hybrid used in the example of FIG. 14.

FIG. 16 shows a phase quadrature hybrid 49 of the kind used in the previous embodiment, of FIG. 14, with its port designation. The scattering matrix, which shows the transformation of complex input signals to complex output signals is shown in the following formula:

$$S = \left(\frac{e^{jx}}{2}\right) \cdot \begin{bmatrix} 0 & 0 & 1 & -j & -1 & j \\ 0 & 0 & j & -1 & -j & 1 \\ 1 & j & x & x & x & x \\ -j & -1 & x & x & x & x \\ -1 & -j & x & x & x & x \\ j & 1 & x & x & x & x \end{bmatrix}$$

where the transformation of a signal input on port c (column c) and output on port 1 (line 1) is given by the matrix. In the matrix, x represent a non-defined value, which is of none interest in this application.

In the respective embodiments above, the property signal strength and/or phase of received signals can be measured. The phase can be measured at different times for received signals in the same radiating element $12_1$–$12_N$, and the obtained values can be compared. Alternatively the phase can be measured for received signals in at least two of the radiating elements $12_1$–$12_N$, and the obtained values can be compared.

For all embodiments above, but one, the phase $\phi_n$ and/or amplitude $A_n$ is controlled by an adaptive feed means $42_1$–$42_N$ associated to each of the radiating elements $12_1$–$12_N$. Since it is of interest to control the relative amplitudes and/or phases between the signals associated with each radiating elements $12_1$–$12_N$, one or possibly more of the adaptive feed means $42_1$–$42_N$ can be replaced by a direct coupling or a fixed (non-variable) feed means (with fixed $\phi_n$ and $A_n$).

The received signal, which is measured is preferably a signal used in the communication, but could also be a special control signal, preferably possible to identify as a control signal, e.g. through its frequency or information content.

The antenna system according to the invention is preferably arranged to be used and mounted on a portable, e.g. hand-held terminal, which preferably is capable of communication with a satellite, e.g. a satellite in a system as Iridium, Global Star, ICO, GPS, etc. For such mountings the radiating elements $12_1$–$12_N$ have to be relatively small. Preferably the radiating elements $12_1$–$12_N$ are arranged as shown in FIG. 2, having a common longitudinal axis. However, the radiating elements $12_1$–$12_N$ can be arranged in other configurations, e.g. if N/2 is an integer, the radiating elements $12_1$–$12_N$ can be arranged in pairs, each radiating element of a pair being arranged opposite each other (180° physical separation in respect to a longitudinal axis), and each pair can have separate longitudinal axes. The radiating elements of such a pair are preferably fed with a relative phase shift of 180°.

Although the invention is described by means of the above examples, naturally, many variations are possible within the scope of the invention.

What is claimed is:

1. A method for controlling the radiation pattern of an antenna means comprising N helically configured radiating elements, where N is an integer greater than 1, and being adapted for receiving or receiving and transmitting RF signals, said method comprising the steps of:
        measuring at least one property of at least one received signal from at least one of said radiating elements, and controlling at least one of the parameters phase ($Q_n$) and amplitude ($A_n$) for received signals and/or signals to be transmitted for at least one of the radiating elements as a response to the measured property of said received signal.

2. The method according to claim 1, wherein
    the step of measuring at least one property of at least one received sign al comprises measuring at least one of the properties signal strength and phase of at least one received signal.

3. The method according to claim 2, wherein
    the signal strength of received signals is measured for at least two radiating elements.

4. The method according to claim 2, wherein
    the phase of received signals is measured for at least two radiating elements.

5. The method according to claim 1, wherein
    said at least one parameter for received signals/signals to be transmitted is controlled for each antenna element as a response to the measured property of said received signal.

6. The method according to claim 1, further comprising the step of:

varying said at least one parameter between a number of predetermined values of said at least one parameter, wherein
signals received in the antenna elements are measured for different values of said at least one parameter, and
said at least one parameter for received signals/signals to be transmitted is set, in response to said measured signal property, for at least a predetermined period of time.

7. The method according to claim 6, wherein said step of varying said at least one parameter comprises
varying said at least one parameter at least once from a first to a second value.

8. The method according to claim 6, wherein
said at least one parameter is varied one at a time for each antenna element.

9. The method according to claim 1, wherein
said at least one property of said at least one received signal is measured separately for each antenna element.

10. The method according to claim 1, further comprising the step of:
combining signals received in said radiating elements, wherein
said step of measuring at least one property is performed on the combined signal.

11. The method according to claim 1, wherein
said at least one parameter is controlled according to an algorithm implemented in transceiver circuits of a radio communication device.

12. The method according to claim 1, wherein
said at least one parameter is varied between values for obtaining at least two differently directed radiation lobes,
the signal strengths of signals received by the radiating elements in said at least two differently directed radiation lobes are measured, and
said at least one parameter is set to the value giving the highest signal strength for at least a predetermined period of time.

13. The method according to claim 12, wherein
two of the at least two differently directed radiation lobes are directed essentially oppositely.

14. The method according to claim 1, wherein
said steps of measuring and controlling are repeated after a predetermined or randomly selected time period.

15. An antenna system, for receiving or receiving and transmitting RF signals, comprising N helically configured radiating elements, where N is an integer greater than 1, a feed device, where each of said radiating elements exhibits a feed portion connected to the feed device,
the feed device includes means for controlling at least one of the parameters phase ($Q_n$) and amplitude ($A_n$) for signals received and/or signals to be transmitted by at least one of the antenna elements, and
means for sensing and measuring at least one property of a signal received in at least one of said radiating elements, said means for sensing and measuring being connected to said means for controlling at least one of said parameters.

16. The antenna system according to claim 15, wherein
said means for sensing being arranged to sense a signal present between said at least one radiating element and its connection to said feed means.

17. The antenna system according to claim 15, further comprising:
a power combiner/divider being connected with the N radiating elements, possibly via means for controlling said at least parameter, and to be connected to transceiver circuits of a radio communication device wherein
said means for sensing being arranged to sense a signal present between said power combiner/divider and said means for controlling at least one of said parameters.

18. The antenna system according to claim 15, further comprising:
a power combiner/divider being connected with the N radiating elements, possibly via means for controlling said at least parameter, and to be connected to transceiver circuits of a radio communication device wherein
said means for sensing is arranged to sense a signal present between said power combiner/divider and said transceiver circuits.

19. The antenna system according to claim 15, wherein the feed device comprises a fixed feed network, having N element ports, each connected to one of the N radiating elements, and
the feed device further includes M means, for controlling said at least one parameter, each of said M means connected to one of M feed ports of the fixed feed network, where M is an integer greater than 1.

20. The antenna system according to claim 15, wherein said means for controlling said at least one parameter includes an algorithm.

21. The antenna system according to claim 20, wherein
said algorithm is included in a digital signal processor of a radio communication device.

22. A radio communication device comprising a housing, a user interface, and receiving or receiving and transmitting circuits connected to an antenna system,
the device includes an antenna system comprising:
N helically configured radiating elements, where N is an integer greater than 1,
a feed device, where each of said radiating elements exhibits a feed portion connected to the feed device, the feed device including means for controlling at least one of the parameters phase ($Q_n$) and amplitude ($A_n$) for signals received and/or signals to be transmitted by at least one of the antenna elements, and
means for sensing and measuring at least one property of a signal received in at least one of said radiating elements, said means for sensing and measuring being connected to said means for controlling at least one of said parameters.

23. The radio communication device according to claim 22, wherein
the N radiating elements are arranged on a carrier being pivotable attached to the housing.

24. The radio communication device according to claim 22, wherein
the N radiating elements are arranged on a carrier being slidably attached to the housing.

25. The radio communication device according to claim 22, wherein
said means for controlling said at least one parameter is supported by said carrier.

* * * * *